Nov. 1, 1938. G. C. ROYSE Re. 20,903

CLUTCH

Original Filed Aug. 20, 1936

INVENTOR
GROVER C. ROYSE
BY Robert A. Lawrence
ATTORNEY

Reissued Nov. 1, 1938

Re. 20,903

UNITED STATES PATENT OFFICE 20,903

CLUTCH

Grover C. Royse, Vallejo, Calif.

Original No. 2,107,308, dated February 8, 1938, Serial No. 96,926, August 20, 1936. Application for reissue July 9, 1938, Serial No. 218,431

8 Claims. (Cl. 192—105)

(Granted under the act of March 3, 1883, as amended April 30, 1928; 370 O. G. 757)

This invention relates to clutches and particularly those clutches of the centrifugal type, wherein the rotation of means on a driving member furnishes the centrifugal force to move those means into engagement with a driven member.

One of the objects of the present invention is the provision of a clutch mechanism of the character described having a plurality of shoes mounted on a driving member and operatively connected with one another for movement in unison under centrifugal force into frictional engagement with a driven member, said shoes and associated parts being symmetrically arranged about their common axis of rotation so as to exert substantially equal pressure per unit area circumferentially of the driven member.

Another object of the invention is the provision of a clutch mechanism of the type designated embodying means for quickly and easily rendering the centrifugally operable shoes ineffective when so desired.

With these and other objects in view, as well as other advantages that may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claims.

In order to make the invention more clearly understood, there is shown in the accompanying drawing, means for carrying the invention into practical use, without limiting the improvements in their useful application to the particular construction, which, for the purpose of explanation, have been made the subject of illustration.

Figure 2:
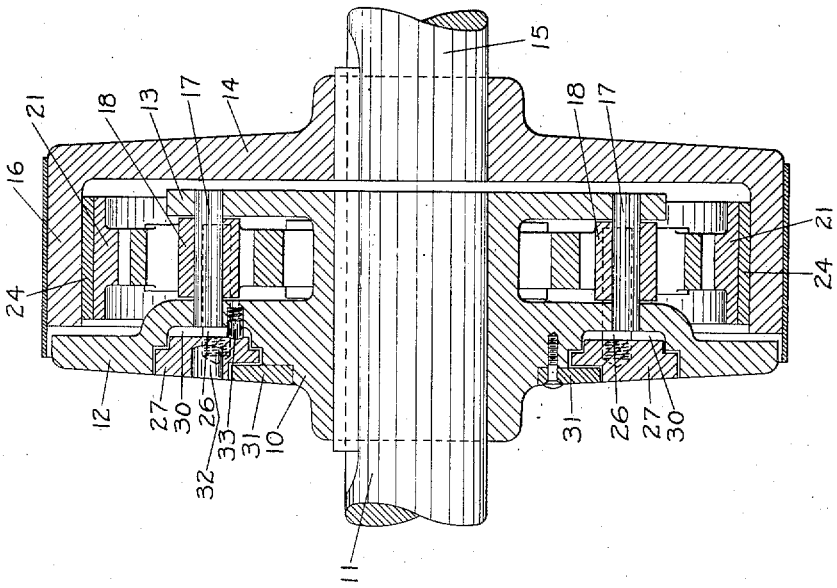
Figure 1:
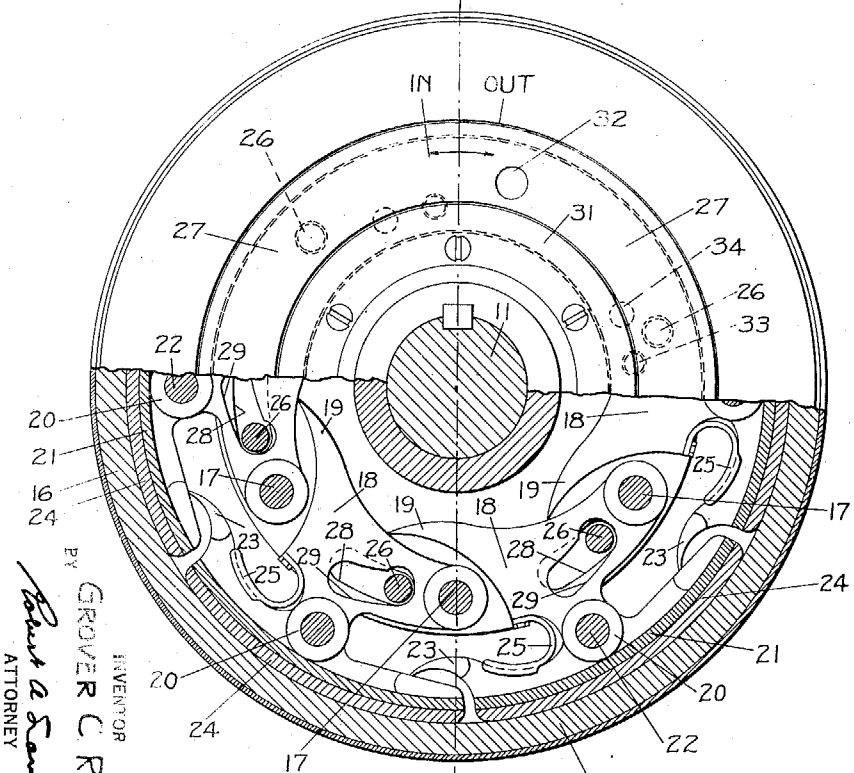

In the accompanying drawing:

Fig. 1 is a view partly in elevation and partly in transverse section of a clutch mechanism constructed in accordance with the invention; and Fig. 2 is a vertical sectional view taken on line 2—2 of Fig. 1.

Referring to the drawing, a clutch mechanism constructed according to the present invention is shown as comprising a spool 10 keyed to a driving shaft 11 and formed with axially spaced flanges 12 and 13. Arranged coaxially with the spool 10 is a drum 14 keyed to a driven shaft 15 and formed with a circumferential flange 16 which overhangs the flange 13 and the space between this flange and the flange 12. Pivotally mounted on pins 17 carried by the flanges 12 and 13 and in the space therebetween are a plurality of levers 18 each formed with a finger 19 disposed in overlapping engagement with the next adjacent lever 18, and with a pair of spaced ears 20. A shoe 21 is pivotally mounted on a pin 22 between the ears 20 of each of the levers 18 and is formed with a finger 23 disposed in overhanging engagement with the end of the next adjacent shoe. The shoes 21 are each formed with an arcuate outer face corresponding to the curvature of the internal circumference of the flange 16 and is provided with a suitable facing 24 for frictional engagement with said flange under centrifugal force when the spool 10 is rotated. Springs 25 are interposed between the levers 18 and the shoes 21 and together with the fingers 19 on the levers 18 and the fingers 23 on the shoes 21, tend to cause the parts to move in unison into and out of engagement with the flange 16.

If and when desired, the clutch may be rendered inoperative by means of a plurality of pins 26 which are carried by a ring 27 and which extend through slots 28 in the flange 12 and through cam slots 29 provided in the levers 18. The ring 27 is mounted for rotation in an annular recess 30 formed in the outer face of the flange 12 and is maintained against displacement therefrom by a ring 31. When the ring 27 and pins 26 carried thereby occupy the "in" position, shown in full lines in Fig. 1, the levers 18 and shoes 21 are free to move into driving engagement with the flange 16 of the drum, but when it is turned to the "out" position the pins 26, riding in the slots 28 and 29, cam the levers 18 and shoes 21 carried thereby radially inward so as to prevent the shoes from engaging the drum under centrifugal force. In this case the shaft 11, spool 10 and parts connected therewith are free to rotate without transmitting power to the drum 14 and shaft 15. The ring 27 may be turned by a suitable spanner engageable with sockets 32 provided in the face of the ring, and is maintained in its desired angular position by a spring detent 33 mounted in the spool 10 for engagement with recesses 34 formed in the inner face of the ring.

From the foregoing, it will be apparent that there is provided a very simple and rugged clutch mechanism in which the centrifugally movable members move in unison and exert equal pressure circumferentially and in which radial movement of the members under centrifugal force is translated into force applied tangentially of the driven member.

The invention as herein described may be modified in construction and arrangement of the parts by those skilled in the art without departing from the nature and scope of the invention as defined in the appended claims.

The invention described herein may be manufactured and used by or for the Government of the United States of America for governmental purposes without the payment of any royalties thereon or therefor.

I claim:

1. A centrifugal clutch comprising a rotatable driving spool carried by a shaft; a rotatable driven drum surrounding said spool; a plurality of levers carried by said spool; and a plurality of friction shoes carried by said levers for movement into driving engagement with said drum under centrifugal force produced by the rotation of said spool, said shoes being engageable with one another to cause them to move in unison.

2. A centrifugal clutch comprising a rotatable driving spool carried by a shaft; a rotatable driven drum surrounding said spool; a plurality of levers carried by said spool; and a plurality of shoes carried by said levers for movement into driving engagement with said drum under centrifugal force produced by the rotation of said spool, adjacent levers being engageable with one another and adjacent shoes being also engageable with one another to cause them to move in unison.

3. A centrifugal clutch comprising a rotatable driving spool carried by a shaft; a rotatable driven drum surrounding said spool; a plurality of lever members carried by said spool; a plurality of friction shoe members carried by said lever members in overlapping relation to one another for movement into driving engagement with said drum under centrifugal force produced by the rotation of said spool, and means for locking said shoes in an inoperative position when desired.

4. A centrifugal clutch comprising a rotatable driving spool carried by a shaft; a rotatable driven drum surrounding said spool; a plurality of lever members carried by said spool; a plurality of friction shoe members carried by said lever members in overlapping relation to one another for movement into driving engagement with said drum under centrifugal force produced by the rotation of said spool, and means engageable with said levers for locking said shoes in inoperative positions when desired.

5. A centrifugal clutch comprising a rotatable driving spool carried by a shaft; a rotatable driven drum surrounding said spool; a plurality of lever members carried by said spool in overlapping relation to one another; a plurality of friction shoe members carried by said lever members for movement into driving engagement with said drum under centrifugal force produced by the rotation of said spool, and a plurality of pins carried by said spool and engageable with cam slots in said levers for locking said shoes out of engagement with said drum when desired.

6. A centrifugal clutch comprising a rotatable driving spool carried by a shaft; a rotatable driven drum surrounding said spool; a plurality of lever members carried by said spool in overlapping relation to one another; a plurality of friction shoe members carried by said lever members for movement into driving engagement with said drum under centrifugal force produced by the rotation of said spool, a ring mounted for rotation on said spool, and a plurality of pins carried by said ring and engageable with cam slots in said levers for locking said shoes out of engagement with said drum.

7. A centrifugal clutch comprising a rotatable driving spool carried by a shaft; a rotatable driven drum surrounding said spool; a plurality of levers carried by said spool; a plurality of friction shoes carried by said levers for movement into driving engagement with said drum under centrifugal force produced by the rotation of said spool, said shoes being engageable with one another to cause them to move in unison, and resilient means interposed between said levers and said shoes to prevent adjacent shoes from movement independently of one another.

8. A centrifugal clutch comprising a rotatable driving spool carried by a shaft; a rotatable driven drum surrounding said spool; a plurality of lever members carried by said spool in overlapping relation to one another; a plurality of friction shoe members carried by said lever members for movement into driving engagement with said drum under centrifugal force produced by the rotation of said spool, a ring mounted for rotatable adjustment on said spool; a plurality of pins carried by said ring and engageable with cam slots in said levers for locking said shoes out of engagement with said drum, and means for maintaining said ring in adjusted position.

GROVER C. ROYSE.